United States Patent [19]
Sato et al.

[11] Patent Number: 4,659,186
[45] Date of Patent: Apr. 21, 1987

[54] SMALL SIZE ZOOM LENS

[75] Inventors: Yasuhisa Sato, Kanagawa; Yasuyuki Yamada, Tokyo; Hiroki Nakayama, Kanagawa, all of Japan

[73] Assignee: Canon Kabushiki Kaisha, Japan

[21] Appl. No.: 709,445

[22] Filed: Mar. 8, 1985

[30] Foreign Application Priority Data

Mar. 12, 1984 [JP] Japan ................................ 59-46854

[51] Int. Cl.$^4$ ......................... G02B 9/62; G02B 15/14
[52] U.S. Cl. ..................................... 350/423; 350/427
[58] Field of Search ........................ 350/426, 423, 427

[56] References Cited
U.S. PATENT DOCUMENTS 4,465,342  8/1984  Tanaka et al. ...................... 350/427

Primary Examiner—John K. Corbin
Assistant Examiner—Rebecca D. Gass
Attorney, Agent, or Firm—Toren, McGeady and Goldberg

[57] ABSTRACT

The disclosed zoom lens is constructed with a front lens group including, from front to rear, a positive lens unit, a negative lens unit and a positive lens unit having a positive overall refractive power. A rear lens group having a negative overall refractive power arranged on the image side of the front lens group moves axially along with the front lens group in differential relation. The rear lens group is constructed with a negative front lens having a glass relatively large Abbe number and a positive rear lens having a glass of relatively small Abbe number to achieve good stability of chromatic aberration correction against zooming.

10 Claims, 18 Drawing Figures

SMALL SIZE ZOOM LENS

BACKGROUND OF THE INVENTION

1. Field of the Invention

This invention relates to small size zoom lenses, and more particularly to small size zoom lenses of shortened total length (the distance from the front vertex to the image surface) suited for leaf shutter type cameras and video cameras.

2. Description of the Prior Art

The recent trend of minimizing the bulk and size of cameras such as leaf shutter type cameras and video cameras, has created the need for shortening the total length of the objective lens in these cameras. Also, a demand has grown for zoom lenses even on small cameras whose lenses are not interchangeable, or on leaf shutter type cameras. Such a zoom lens is necessarily as short in total length as conventionally employed fixed focal length lenses.

Many zoom lenses have been proposed which include the standard angle of view used widely in the ordinary leaf shutter type cameras (in terms of the 35 mm still camera, the total angular field of view 2w=47° for a focal length of about f=50 mm), for example, in Japanese Patent Publication No. SHO 49-29146, a zoom lens includes two lens groups. Counting from the front, the first lens group is of negative refractive power and the second is of positive refractive power. The separation between the two lens groups is variable to change the magnification. Because the refractive power arrangement is in the order of negative and positive, the back-focal distance is long, which is advantageous in a single lens reflex camera, but tends to make the total length of the lens too long in leaf shutter type cameras.

The present applicant has previously proposed a zoom lens whose front and rear lens groups are of positive and negative refractive powers, respectively, and are movable in differential relation to effect zooming, as set forth in Japanese Laid-Open Application No. SHO 56-128911 corresponding to U.S. patent application Ser. No. 243,209, filed Mar. 12, 1981 now abandoned, and in Japanese Laid-Open Patent Application No. SHO 57-201213. As disclosed in these patent applications, the use of a new refractive power arrangement of positive and negative from the front to rear, provides the possibility of shortening the back-focal distance and achieving a zoom lens of shortened total length.

SUMMARY OF THE INVENTION

A first object of the present invention is to provide a compact zoom lens which is shortened in the length from the front vertex to the image surface.

A second object is to maintain the various aberrations stable throughout the zooming range.

A third object is to achieve good correction of chromatic aberrations, particularly lateral chromatic aberration against zooming.

DETAILED DESCRIPTION OF THE PREFERRED EMBODIMENTS

Figure 1:
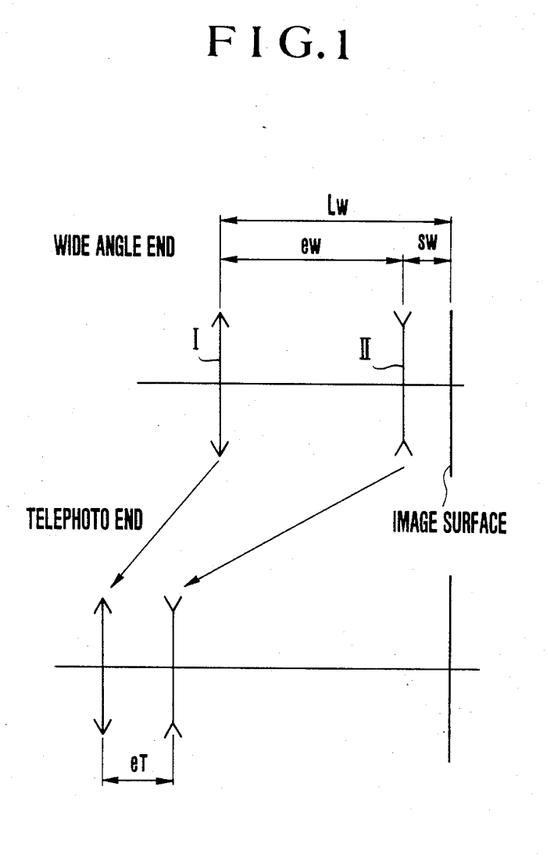
FIG. 1 is a diagram illustrating the fundamental arrangement of the zoom lens.
Figure 2:
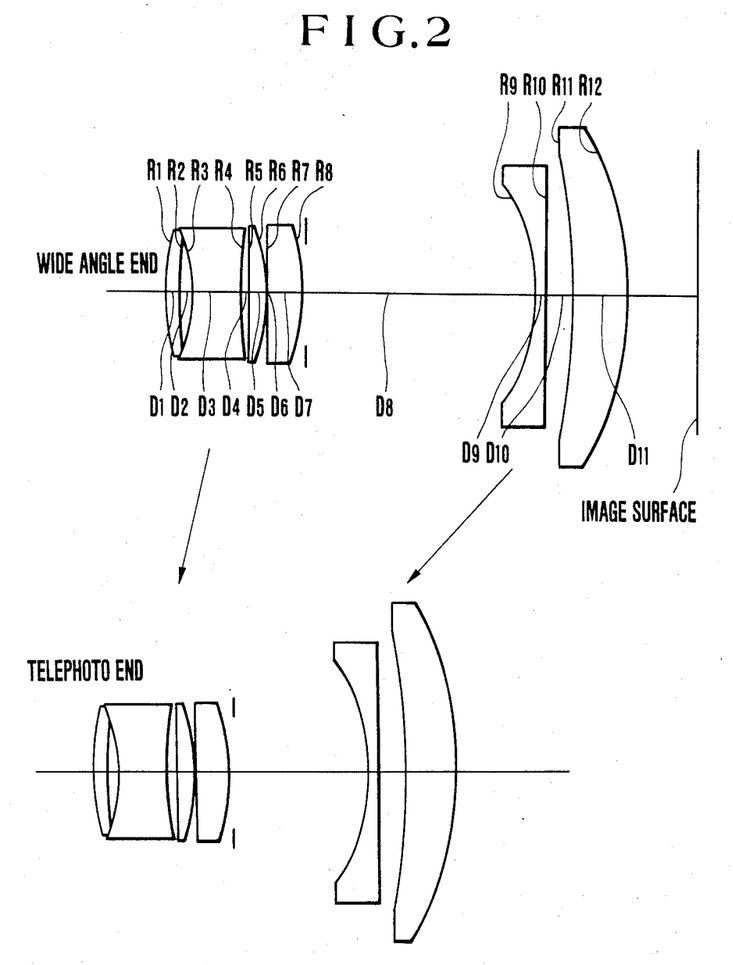
FIG. 2 is a longitudinal section view of an example of a specific zoom lens.
Figure 3A:
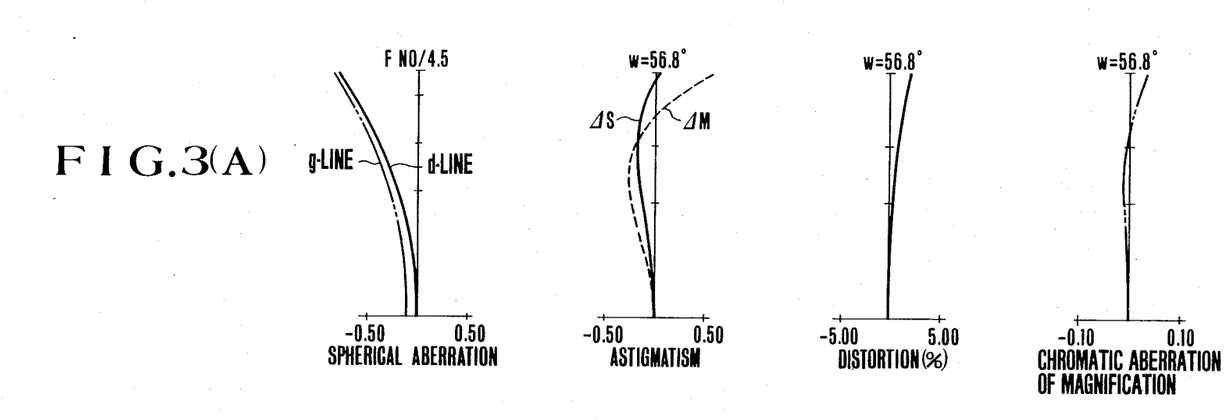
FIGS. 3(A), 3(B) and 3(C) are graphic representations of the various aberrations concerning the example 1.
Figure 3B:
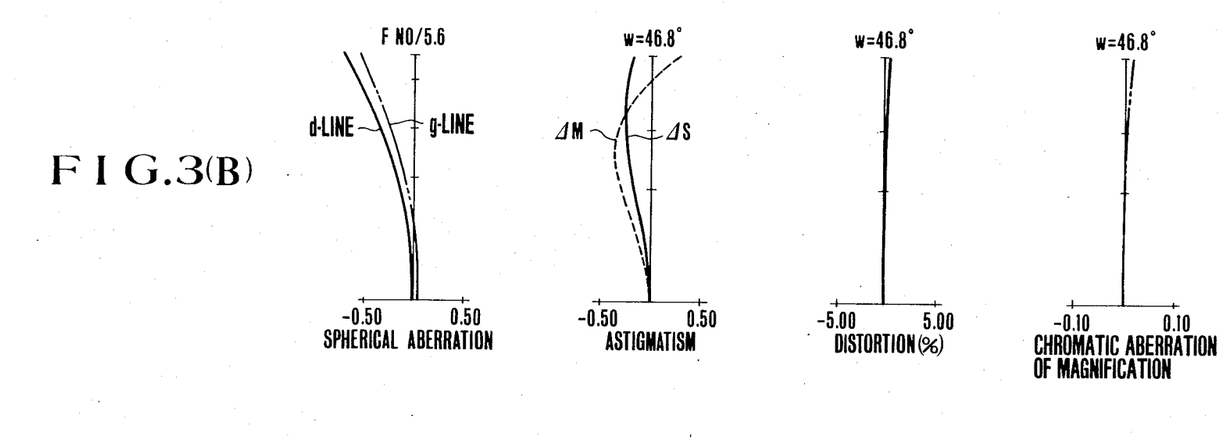
Figure 3C:
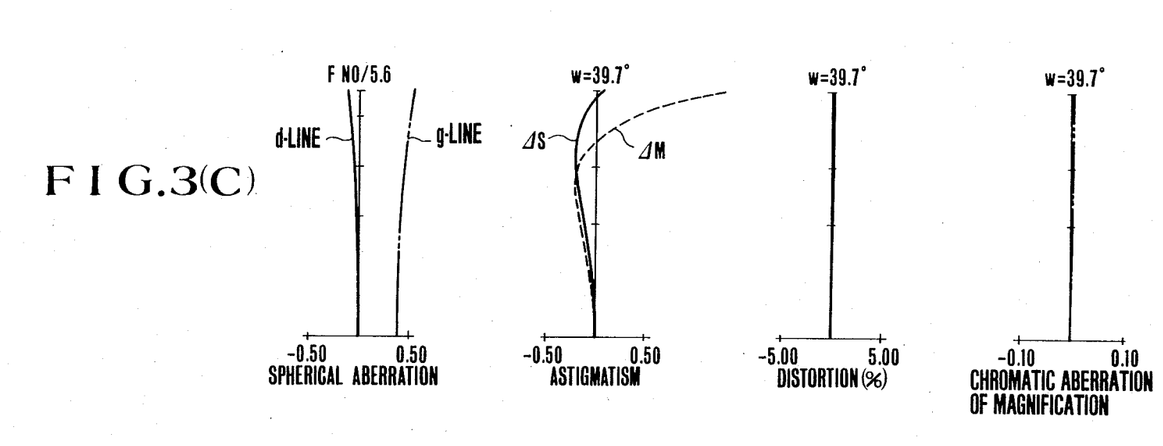
Figure 4:
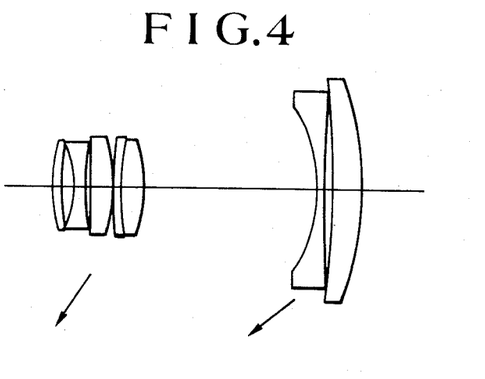
FIG. 4 is a longitudinal section view of another example of the specific lens.
Figure 5A:
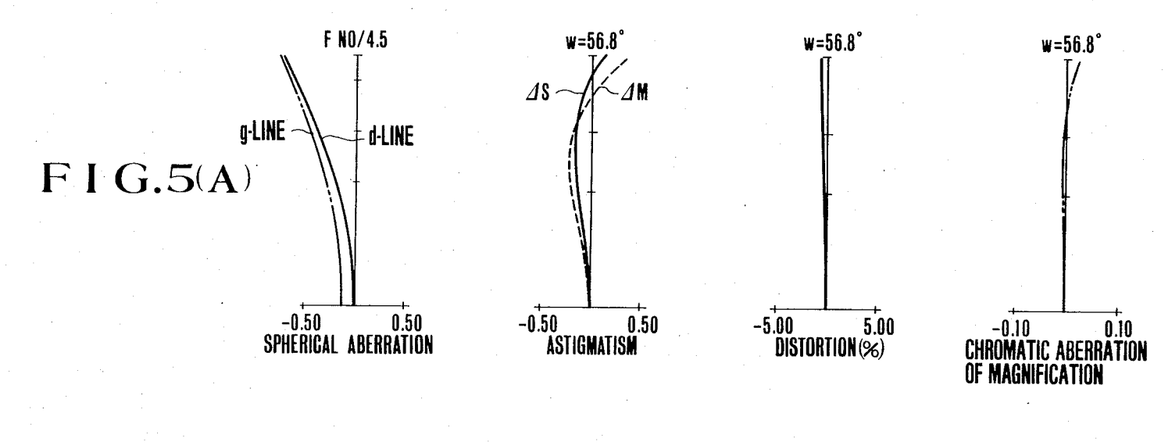
FIGS. 5(A), 5(B) and 5(C) are graphic representations of the various aberrations concerning the example 2.
Figure 5B:
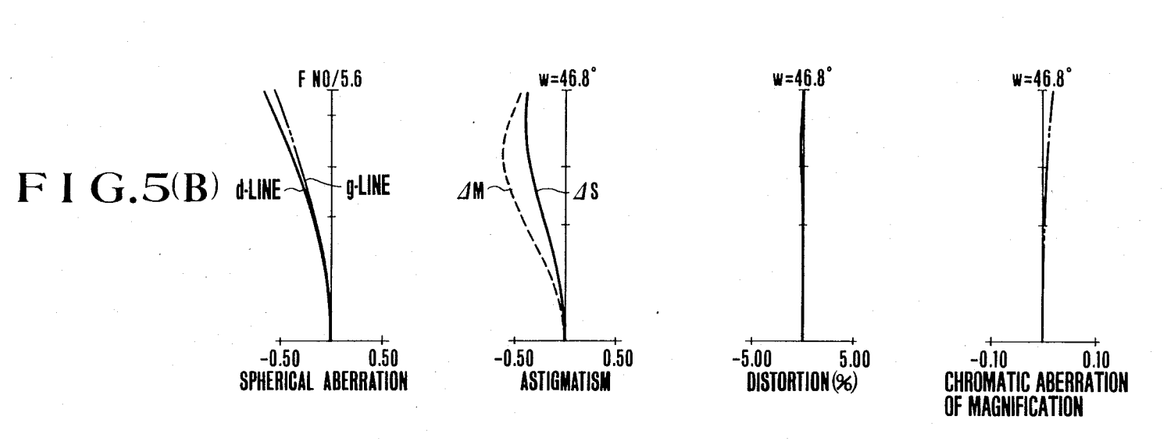
Figure 5C:
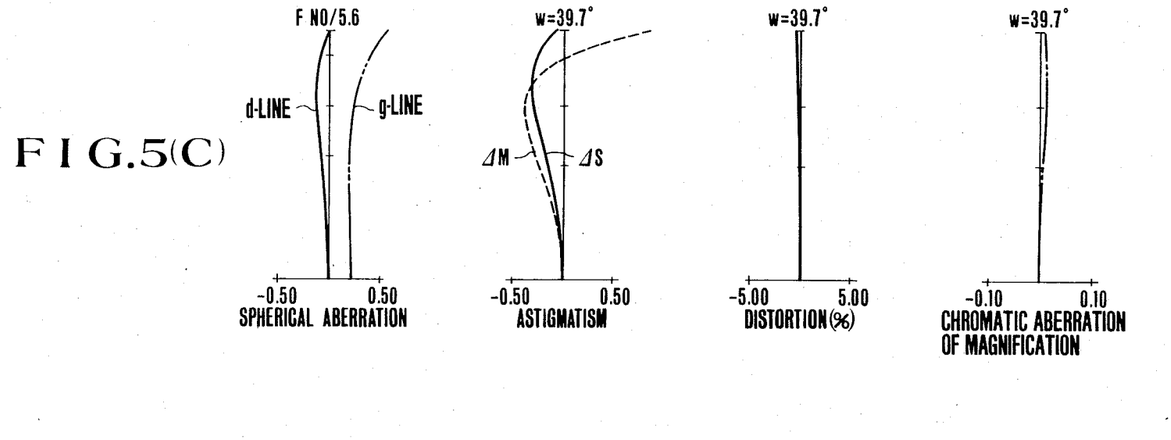
Figure 6:
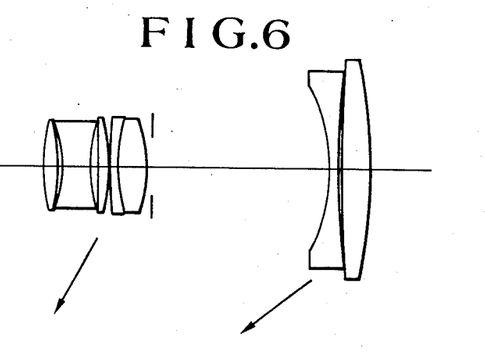
FIG. 6 is a longitudinal section view of still another example of the specific lens.
Figure 7A:
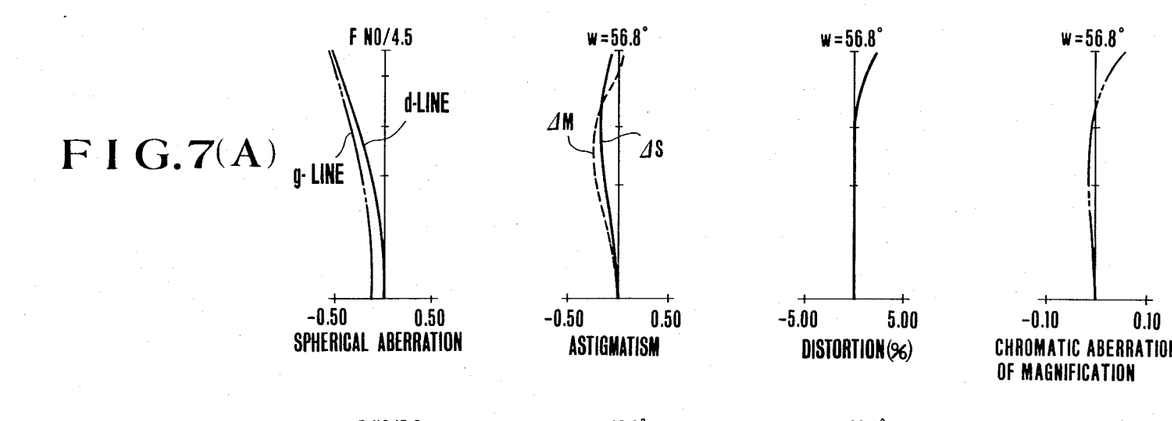
FIGS. 7(A), 7(B) and 7(C) are graphic representations of the various aberrations concerning the example 3.
Figure 7B:
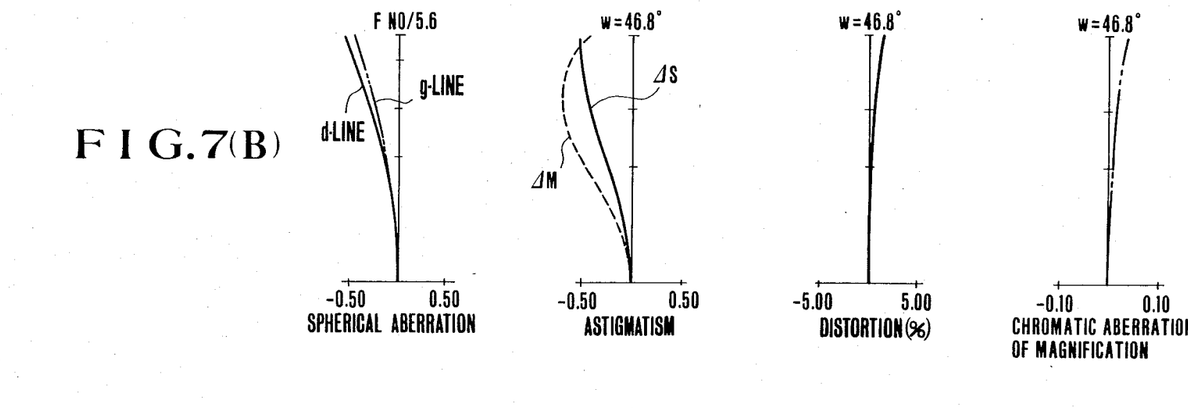
Figure 7C:
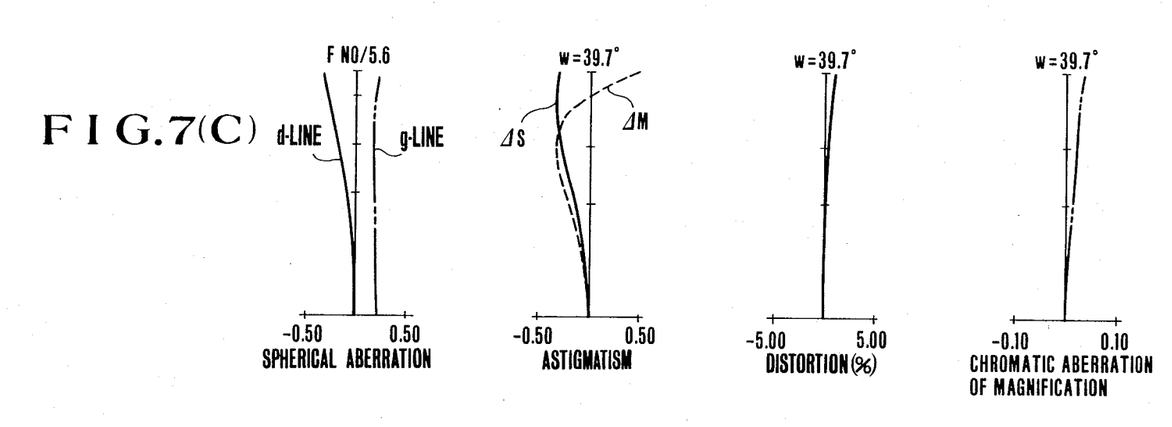
Figure 8:
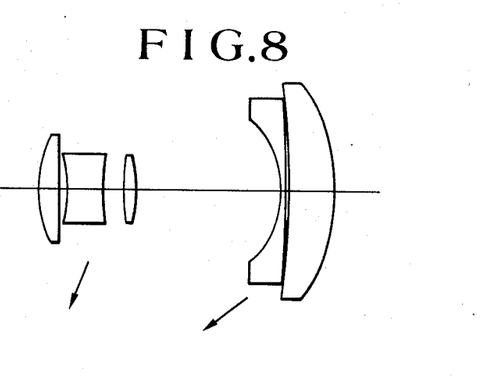
FIG. 8 is a longitudinal section view of a further example of the specific lens.
Figure 9A:
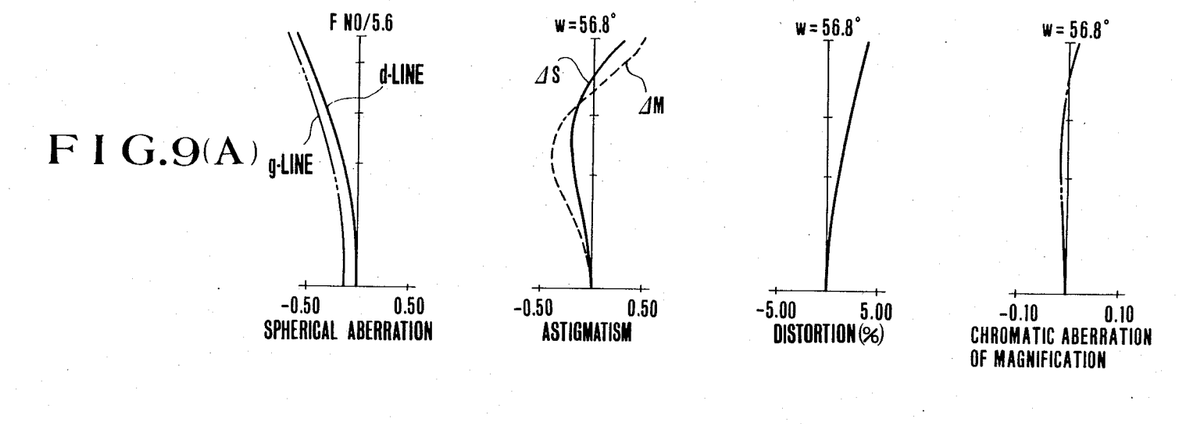
FIGS. 9(A), 9(B) and 9(C) are graphic representations of the various aberrations concerning the example 4.
Figures 9B, 9C:
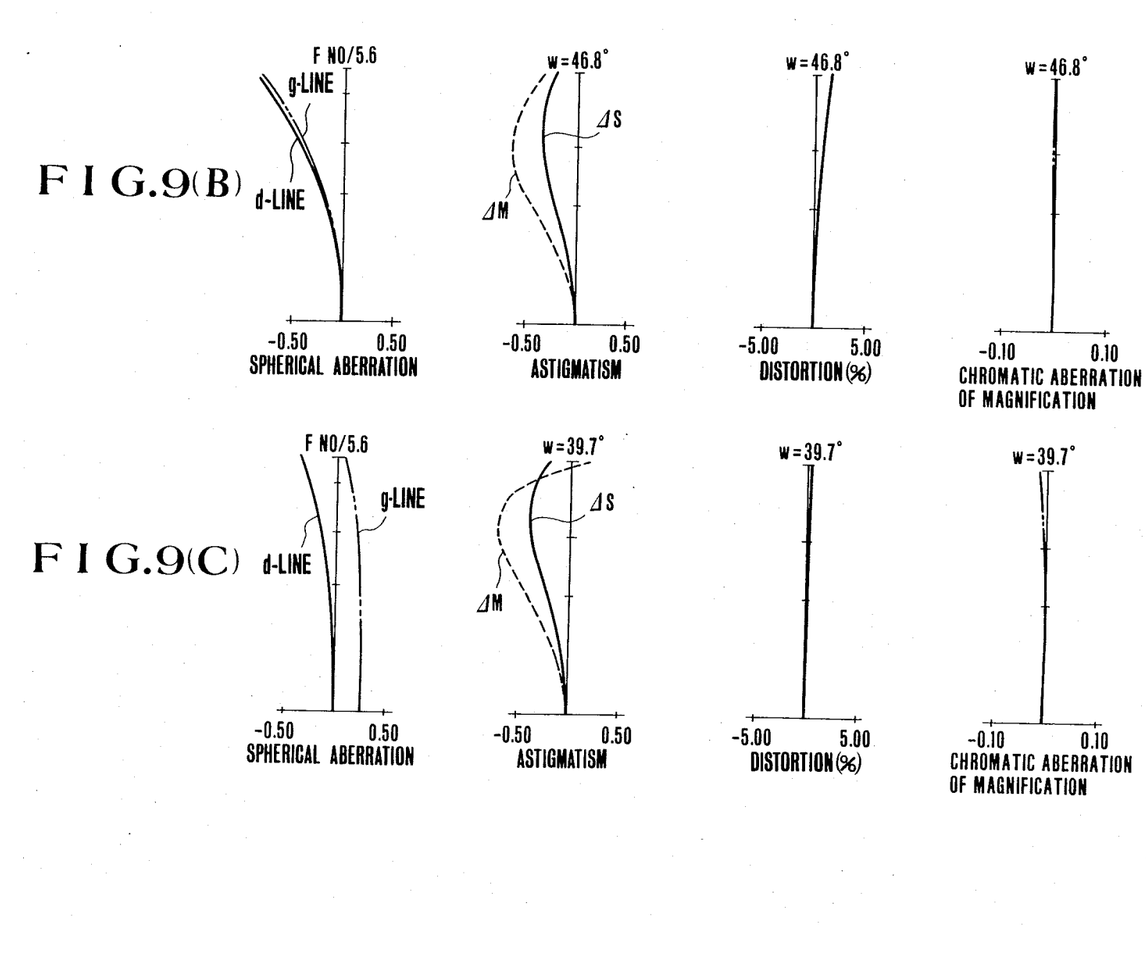

The zoom lens shown in FIG. 1 operates in such a manner that when varying the magnification from the wide angle side to the telephoto side, the first lens group I and the second lens group II are moved axially forward while decreasing the separation between them. Such a zoom lens has the minimum total length at the wide angle end, and the maximum at the telephoto end. Upon consideration of good portability of the camera, it is desirable to further reduce the minimum total length.

Equations for the total length $L_W$ of the lens and for the back focal distance $S_W$ may be expressed as follows:

$$L_W = e_W + S_W$$

$$S_W = \frac{1 - e_W \cdot \phi_1}{\phi_W}$$

where $e_W$ is the interval between the principal points of the first and second lens groups in the wide angle end, and $\phi_W$ is the refractive power of the entire system in the wide angle end.

Substituting $S_W$ in the equation for $L_W$ gives $$L_W = e_W + \frac{1 - e_W \cdot \phi_1}{\phi_W} \quad (A)$$

$$= \frac{1}{\phi_W} + \left(1 - \frac{\phi_1}{\phi_W}\right) \cdot e_W$$

where $\phi_1$ is the refractive power of the first lens group. Considering that the value of the refractive power in the wide angle end, i.e. $\phi_W$, is constant, it follows from equation (A) that the larger the refractive power $\phi_1$ and the smaller the principal point interval $e_W$, the shorter the total length $L_W$ of the lens becomes.

Meanwhile, equations for the refractive powers $\phi_W$ and $\phi_T$ in the wide angle and telephoto ends respectively may be expressed as follows:

$$\phi_W = \phi_1 + \phi_2 - e_W \phi_1 \phi_2 \quad (B)$$

$$\phi_T = \phi_1 + \phi_2 - e_T \phi_1 \phi_2 \quad (C)$$

where $\phi_2$ is the refractive power of the second lens group. Here, values for the refractive powers $\phi_W$ and $\phi_T$ are initially given, and a value for the principal point interval $e_T$ is unequivocally chosen such that the first and second lens groups, when in the telephoto end, lies as near to each other as possible, without causing mechanical interference with each other, as is advantageous in minimizing the size of the zoom lens.

Therefore, the equations (B) and (C) represent relationships among the refractive powers $\phi_1$ and $\phi_2$ and the principal point interval $e_W$. If one of the refractive powers $\phi_1$ and $\phi_2$ and the principal point interval $e_W$ is given a certain value, equations (B) and (C) turn out to be simultaneous equations of the secondary degree from which a refractive power distribution from the zoom lens can be found.

Increasing the refractive power $\phi_1$ of the first lens group while decreasing the interval $e_W$ between the principal points of the first and second lens groups can shorten the total length $L_W$ of the lens in the wide angle end. When the refractive power $\phi_1$ is greatly increased, however, the refractive power $\phi_2$ of the second lens group also takes a large value. The result is that the Petzval sum increases to the negative direction, so that curvature of field becomes over-corrected, there is a loss of flatness of the image surface, and coma is produced in the intermediate zone of the image frame. Good aberration correction thus becomes difficult. Also, when the principal point interval $e_W$ is greatly decreased, the refractive powers $\phi_1$ and $\phi_2$ must be increased in the positive and negative senses, respectively. Otherwise, the prescribed zoom ratio cannot be obtained. This results in similar phenomena to those described above.

For this reason, in order to achieve good correction of aberrations throughout the entire zooming range, it is preferred that the above-decribed principle of construction of the first and second lens groups is set forth by the following conditions:

$$1.0\phi_W < \phi_1 < 1.5\phi_W \qquad (I)$$

$$-1.5\phi_W < \phi_2 < -0.5\phi_W \qquad (II)$$

$$0.4/\phi_W < e_W < 0.8/\phi_W \qquad (III)$$

The technical significance of each of the inequalities of condition is explained below.

Either when the refractive power $\phi_1$ of the first lens group exceeds the upper limit of inequalities of condition (I), or when the refractive power $\phi_2$ of the second lens group exceeds the lower limit of inequalities of condition (II), despite achieving a short total length of the lens, over-correction of curvature of field results and the coma in the intermediate zone of the image frame is increased as mentioned above. It is very difficult to suitably correct these aberrations. Conversely, either when the refractive power $\phi_1$ exceeds the lower limit of inequalities of condition (I), or when the refractive power $\phi_2$ exceeds the upper limit of inequalities of condition (II), the total length of the lens becomes long, and, what is worse, the second lens group interferes with the image surface, making it difficult to provide an usable photographic lens.

When the interval $e_W$ between the principal points of the first and second lens groups in the wide angle end exceeds the upper limit of inequalities of condition (III), the second lens group interferes with the image surface so that, similarly to the above, an usable photographic lens is difficult to achieve. When the lower limit is exceeded, the refractive powers $\phi_1$ and $\phi_2$ of the first and second lens groups must be increased in the positive and negative senses, respectively, to obtain the prescribed zoom ratio. As a result, the curvature of field is over-corrected, and the coma in the intermediate zone of the image frame is also increased. Moreover, it is difficult to suitably correct these aberrations.

Though the objects of the invention are accomplished by satisfying the above-stated various conditions, in order to achieve an improvement of stabilization of, in particular, chromatic aberrations throughout the zooming range so that all the aberrations are corrected in good balance, it is preferred that the second lens group satisfies the following conditions:

$$-0.8/\phi_W < R_A < -0.3/\phi_W \qquad (1)$$

$$40 < \nu_A < 60 \qquad (2)$$

$$35 < \nu_B < 55 \qquad (3)$$

wherein $R_A$ is the radius of curvature of the front surface of the first lens, and $\nu_A$ and $\nu_B$ are the Abbe numbers of the glasses of the first and second lenses, respectively.

Inequalities of condition (1) maintain the astigmatism and coma stable throughout the zooming range and suitably correct distortion in the wide angle positions. When the upper limit of inequalities of condition (1) is exceeded, the refractive power of that lens surface is too strong in the negative sense. Therefore, the distortion increases in the positive direction in the wide angle positions, and the astigmatism varies in a direction to be under-corrected during zooming from the wide angle end to the telephoto end. Upward coma also increases. When the lower limit of the inequalities of condition (1) is exceeded, the negative refractive power of the lens surface is too weak. Therefore, though good correction of aberrations is achieved in the wide angle positions, when zooming to the telephoto end, the astigmatism varies greatly and is over-corrected. Downward coma also is produced.

Inequalities of conditions (2) and (3) are particularly to minimize variation of the lateral chromatic aberration with zooming. As in the zoom lens disclosed in the above-mentioned Japanese Laid-Open Patent Application No. SHO 57-201213, if a concave lens of negative refractive power is arranged in a nearest position of the second lens group to the image surface, the color dispersion of this concave lens in some cases causes the lateral chromatic aberration for rays of short wavelength, for example, g-line of 436 nm, to vary from under-correction to over-correction during zooming from the wide angle to the telephoto end.

In the present invention, therefore, the nearest position to the image surface in the second lens group is taken by a lens of positive power made of a glass of relatively high dispersion (small Abbe number) as the second lens of the second lens group, and a first lens of the second lens group on the object side of the second lens is made of a glass of relatively low dispersion (large Abbe number), thereby giving an advantage of achieving good stability of chromatic aberration throughout the zooming range.

When either the upper limit of condition (2), or the lower limit of condition (3) is exceeded, the range of variation of lateral chromatic aberration with zooming is reduced, but the range of variation of longitudinal chromatic aberration increases, causing the imagery in the paraxial zone of the image frame to lower objectionably.

When either the lower limit of the inequalities of condition (2) or the upper limit of the inequalities of condition (3) is exceeded, the lateral chromatic aberration varies in a direction to be over-corrected objectionably during zooming to the telephoto end.

Thus, a small size zoom lens corrected for the image aberrations in good balance with good stability of chromatic aberration correction throughout the entire zooming range can be realized. Nonetheless, for improving particularly the flatness of the image surface over the entire area of the image frame and further improving the imaging performance, the front surface of the first lens of the second lens group is made an aspherical surface of such form that as the radial distance increases, the negative refractive power increases. The use of this aspherical surface makes it possible to minimize the variation of curvature of field and astigmatism to be under-corrected in a region from the intermediate point to the telephoto end in the zooming range.

In the present invention, focusing is preferably carried out by axially moving the lens system as a whole, because the variation of the aberrations can be limited to a minimum. However, either the first or the second lens group only may be moved with an advantage of simplifying the structure of the lens mounting mechanism.

Figure 10:
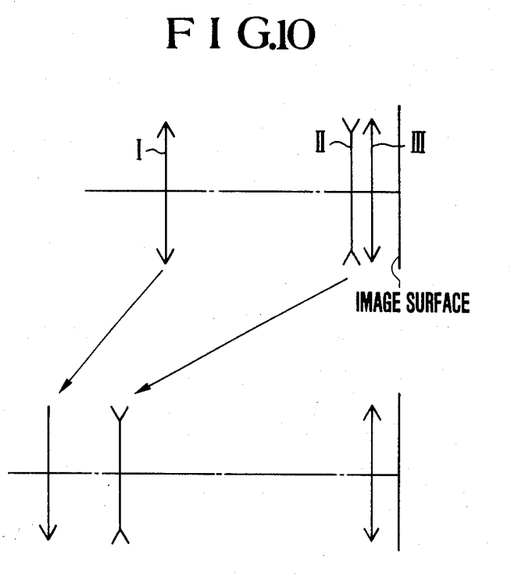
FIG. 10 is a diagram illustrating the optical arrangement of an example of modification.

Though examples of the invention to be described will be illustrated as comprising two lens groups, a third lens group III may be arranged in rear of the second lens group II to remain stationary during zooming, as depicted in FIG. 10, for the purpose of obtaining further assistance in good correction of aberrations. This third lens group III may be otherwise arranged to be movable for focusing.

It is also possible to use a focusing lens group of positive refractive power arranged in front of the first lens group to be stationary during zooming.

In the following examples of the invention, Ri is the radius of curvature of the i-th lens surface counting from the front, Di is the i-th lens thickness or air separation counting from the front, and Ni and νi are respectively the refractive index and Abbe number of the glass of the i-th lens element counting from the front.

In Example 3, the asterisk (*) indicates the aspherical lens surface which is defined by the following equation for departure X from the osculating spherical surface having the radius of curvature R in the x-axis parallel to the optical axis, with the direction in which light advances being taken as positive and the y-axis perpendicular to the x-axis, $$x = \frac{\left(\frac{1}{R}\right) y^2}{1 + \sqrt{1 - \left(\frac{y}{R}\right)^2}} + a_1 y^2 + a_2 y^4 + a_3 y^6 + a_4 y^8 + a_5 y^{10}$$

where $a_1, a_2, a_3, a_4$ and $a_5$ are the aspherical coefficients.

If the third lens in the first lens group is in the form of a doublet of negative and positive lenses cemented together as in Examples 2 and 3, an effect of maintaining the chromatic aberrations, particularly the longitudinal chromatic aberration, stable throughout the zooming range is produced, with an advantage that the stabilized lateral and longitudinal chromatic aberrations are well balanced with each other.

As has been described above, according to the present invention, a zoom lens which enables a remarkable reduction in the total length while still achieving good stability of aberrations and particularly chromatic aberrations for high grade imaging performance is realized.

EXAMPLE 1

| F = 40 − 60 | FNO = 1:4.5 − 5.6 | 2ω = 56.8° − 39.7° | |
|---|---|---|---|
| R1 = 26.53 | D1 = 1.48 | N1 = 1.75500 | ν1 = 52.3 |
| R2 = 231.72 | D2 = 1.20 | | |
| R3 = −18.35 | D3 = 4.98 | N2 = 1.74950 | ν2 = 35.3 |
| R4 = 51.56 | D4 = 0.79 | | |
| R5 = −1885.34 | D5 = 1.74 | N3 = 1.69680 | ν3 = 55.5 |
| R6 = −28.31 | D6 = 0.15 | | |
| R7 = 362.79 | D7 = 3.62 | N4 = 1.69680 | ν4 = 55.5 |
| R8 = −21.28 | D8 = variable | | |
| R9 = −19.98 | D9 = 1.00 | N5 = 1.77250 | ν5 = 49.6 |
| R10 = −451.43 | D10 = 2.61 | | |
| R11 = −97.15 | D11 = 5.34 | N6 = 1.64328 | ν6 = 47.9 |
| R12 = −42.06 | | | |

| f | D8 |
|---|---|
| 40 | 24.24 |
| 50 | 18.24 |
| 60 | 14.24 |

$ø1 = 1.333 \, øW$
$ø2 = −øW$
$eW = 0.5/øW$
$RA = −0.5/øW$
$νA = 49.6$
$νB = 47.9$

EXAMPLE 2

| F = 40 − 60 | FNO = 1:4.5 − 1:5.6 | 2ω = 56.8° − 39.7° | |
|---|---|---|---|
| R1 = 22.86 | D1 = 1.54 | N1 = 1.77250 | ν1 = 49.6 |
| R2 = 60.85 | D2 = 1.30 | | |
| R3 = −17.48 | D3 = 2.44 | N2 = 1.79952 | ν2 = 42.2 |
| R4 = 47.49 | D4 = 0.40 | | |
| R5 = 201.94 | D5 = 3.51 | N3 = 1.77250 | ν3 = 49.6 |
| R6 = −23.90 | D6 = 0.15 | | |
| R7 = 265.24 | D7 = 1.00 | N4 = 1.67270 | ν4 = 32.1 |
| R8 = 36.32 | D8 = 3.40 | N5 = 1.60311 | ν5 = 60.7 |
| R9 = −20.66 | D9 = variable | | |
| R10 = −23.17 | D10 = 1.00 | N6 = 1.65160 | ν6 = 58.6 |
| R11 = 249.48 | D11 = 1.05 | | |
| R12 = −148.32 | D12 = 4.50 | N7 = 1.71700 | ν7 = 47.9 |
| R13 = −57.40 | | | |

| f | D9 |
|---|---|
| 40 | 26.42 |
| 50 | 19.01 |
| 60 | 14.07 |

$ø1 = 1.25 \, øW$
$ø2 = −0.863 \, øW$
$eW = 0.646/øW$
$RA = −0.579/øW$
$νA = 58.6$
$νB = 47.9$

EXAMPLE 3

| F = 40 − 60 | FNO = 1:4.5 − 1:5.6 | 2ω = 56.8° − 39.7° | |
|---|---|---|---|
| R1 = 31.82 | D1 = 1.79 | N1 = 1.77250 | ν1 = 49.6 |
| R2 = −403.16 | D2 = 0.84 | | |
| R3 = −18.59 | D3 = 4.29 | N2 = 1.79952 | ν2 = 42.2 |
| R4 = 42.51 | D4 = 1.04 | | |
| R5 = −332.93 | D5 = 1.55 | N3 = 1.77250 | ν3 = 49.6 |
| R6 = −28.21 | D6 = 0.15 | | |
| R7 = 109.47 | D7 = 1.00 | N4 = 1.67270 | ν4 = 32.1 |

-continued

| F = 40 – 60  FNO = 1:4.5 – 1:5.6  2ω = 56.8° – 39.7° | | | |
|---|---|---|---|
| R8 = 33.28 | D8 = 4.44 | N5 = 1.60311 | ν5 = 60.7 |
| R9 = –18.91 | D9 = variable | | |
| *R10 = –26.71 | D10 = 1.00 | N6 = 1.75500 | ν6 = 52.3 |
| R11 = 96.39 | D11 = 0.59 | | |
| R12 = 219.29 | D12 = 4.19 | N7 = 1.66892 | ν7 = 45.0 |
| R13 = –105.10 | | | |

| f | D9 |
|---|---|
| 40 | 27.19 |
| 50 | 21.02 |
| 60 | 16.91 |

| | |
|---|---|
| $\phi_1 = 1.25\ \phi_W$ | R10: aspherical surface |
| $\phi_2 = -1.037\ \phi_W$ | a1 = 0 |
| $e_W = 0.665/\phi_W$ | a2 = $-1.775 \times 10^{-6}$ |
| $R_A = -0.668/\phi_W$ | a3 = $3.859 \times 10^{-9}$ |
| $\nu_A = 52.3$ | a4 = $6.606 \times 10^{-13}$ |
| $\nu_B = 45$ | a5 = $-4.289 \times 10^{-13}$ |

EXAMPLE 4

| F = 40 – 60  FNO = 1:5.6  2ω = 56.8° – 39.7° | | | |
|---|---|---|---|
| R1 = 20.56 | D1 = 3.22 | N1 = 1.75500 | ν1 = 52.3 |
| R2 = –334.58 | D2 = 0.86 | | |
| R3 = –28.34 | D3 = 5.00 | N2 = 1.74950 | ν2 = 35.3 |
| R4 = 22.66 | D4 = 3.21 | | |
| R5 = 39.21 | D5 = 2.10 | N3 = 1.69680 | ν3 = 55.5 |
| R6 = –20.37 | D6 = variable | | |
| R7 = –15.53 | D7 = 1.00 | N4 = 1.77250 | ν4 = 49.6 |
| R8 = –424.70 | D8 = 0.43 | | |
| R9 = –140.28 | D9 = 6.78 | N5 = 1.64328 | ν5 = 47.9 |
| R10 = –29.44 | | | |

| f | D6 |
|---|---|
| 40 | 21.20 |
| 50 | 15.20 |
| 60 | 11.20 |

| |
|---|
| $\phi_1 = 1.333\ \phi_W$ |
| $\phi_2 = -\phi_W$ |
| $e_W = 0.5/\phi_W$ |
| $R_A = -0.388/\phi_W$ |
| $\nu_A = 49.6$ |
| $\nu_B = 47.9$ |

What is claimed is:

1. A zoom lens comprising:
   a front lens group including, from front to rear, a positive lens unit, a negative lens unit and a positive lens unit and having a positive overall refractive power; and
   a rear lens group on the image side of said front lens group arranged to axially move along with said front lens group and independently of said front lens group, and having a negative overall refractive power,
   said rear lens group including a negative lens and a positive lens arranged behind said negative lens, and satisfying the following conditions:

$$40 < \nu_A < 60$$

$$35 < \nu_B < 55$$

where $\nu_A$ is the Abbe number of the negative lens, and $\nu_B$ is the Abbe number of the positive lens.

2. A zoom lens according to claim 1, satisfying the following conditions:

$$1.0\phi_W < \phi_1 < 1.5\phi_W$$

$$-1.5\phi_W < \phi_2 < -0.5\phi_W$$

$$0.4/\phi_W < e_W < 0.8/\phi_W$$

where $\phi_W$ is the refractive power of the whole system at the wide angle end, $\phi_1$ is the refractive power of said front lens group, $\phi_2$ is the refractive power of said rear lens group, and $e_W$ is the interval between the principal points of said first and said second lens groups in the wide angle end.

3. A zoom lens according to claim 1, satisfying the following conditions:

$$-\frac{0.8}{\phi_W} < R_A < -\frac{0.3}{\phi_W}$$

where $R_A$ is the radius of curvature of the frontmost lens surface of said rear lens group and $\phi_W$ is the refractive power of the whole system at the wide angle end.

4. A zoom lens comprising:
   a front lens group including, from front to rear, a positive first lens unit, a negative second lens unit and a positive third lens unit and having a positive overall refractive power; and
   a rear lens group on the image side of said front lens group arranged to axially move along with said front lens group and independently of the front lens group, and having a negative overall refractive power,
   wherein said rear lens group consists of a negative lens concave toward the front and a positive lens convex toward the rear arranged behind said negative lens.

5. A zoom lens according to claim 4, satisfying the following conditions:

$$1.0\phi_W < \phi_1 < 1.5\phi_W$$

$$-1.5\phi_W < \phi_2 < -0.5\phi_W$$

$$0.4/\phi_W < e_W < 0.8/\phi_W$$

where $\phi_W$ is the refractive power of the whole system at the wide angle end, $\phi_1$ and $\phi_2$ are the refractive powers of said front and said rear lens groups, and $e_W$ is the interval between the principal points of said two groups in the wide angle end.

6. A zoom lens according to claim 4, wherein the Abbe number of the negative lens of said rear lens group is larger than the Abbe number of the positive lens.

7. A zoom lens according to claim 6, satisfying the following conditions:

$$40 < \nu_A < 60$$

wherein $\nu_A$ is the Abbe number of said negative lens.

8. A zoom lens according to claim 6, satisfying the following conditions:

$$35 < \nu_B < 55$$

wherein $\nu_B$ is the Abbe number of said positive lens.

9. A zoom lens according to claim 4, wherein said third lens unit includes two positive lenses.

10. A zoom lens according to claim 9, wherein one of said two positive lenses is a cemented lens.

* * * * *